United States Patent [19]

Jejelowo

[11] Patent Number: 5,359,015

[45] Date of Patent: Oct. 25, 1994

[54] METALLOCENE CATALYSTS AND THEIR PRODUCTION AND USE

[75] Inventor: Moses O. Jejelowo, Kingwood, Tex.

[73] Assignee: Exxon Chemical Patents Inc., Linden, N.J.

[21] Appl. No.: 190,718

[22] Filed: Feb. 1, 1994

Related U.S. Application Data

[63] Continuation of Ser. No. 31,054, Mar. 12, 1993, abandoned, which is a continuation of Ser. No. 922,124, Jul. 29, 1992, abandoned, which is a continuation-in-part of Ser. No. 865,579, Apr. 9, 1992, Pat. No. 5,281,679, which is a continuation-in-part of Ser. No. 788,972, Nov. 7, 1991, abandoned.

[51] Int. Cl.$^5$ .................................................. C08F 4/64
[52] U.S. Cl. ...................................... 526/114; 526/113; 526/118; 526/119; 526/127; 526/160; 526/348.6; 502/113
[58] Field of Search ............... 526/113, 114, 118, 119, 526/127, 160

[56] References Cited

U.S. PATENT DOCUMENTS

| | | | |
|---|---|---|---|
| 4,808,561 | 2/1989 | Welborn, Jr. ....................... | 502/104 |
| 4,841,004 | 6/1989 | Kaminsky et al. ................. | 526/160 |
| 4,874,880 | 10/1989 | Miya et al. ......................... | 556/53 |
| 4,931,417 | 6/1990 | Miya et al. ......................... | 502/117 |
| 4,935,474 | 6/1990 | Ewen et al. ........................ | 526/114 |
| 4,939,217 | 7/1990 | Stricklen ............................ | 526/114 |
| 4,962,248 | 10/1990 | Winter et al. ...................... | 585/12 |
| 5,132,262 | 7/1992 | Rieger et al. ...................... | 502/117 |

FOREIGN PATENT DOCUMENTS 0284708 10/1988 European Pat. Off. .
0344887 12/1989 European Pat. Off. .

*Primary Examiner*—Joseph L. Schofer
*Assistant Examiner*—David Wu
*Attorney, Agent, or Firm*—Jaimes Sher

[57] ABSTRACT

An improved catalyst system and process of producing polyolefins having a controllable broadened molecular weight distribution utilizing transition metal metallocene catalyst systems, wherein at least one of the metallocenes has at least one cyclopentadienyl ring being substituted by at least one optionally substituent having a 2° or 3° carbon atom with which it is covalently bonded to the cyclopentadienyl ring. The method for forming the catalyst system of this present invention can be either by a physical or a chemical mixing process.

17 Claims, No Drawings

METALLOCENE CATALYSTS AND THEIR PRODUCTION AND USE

This is a continuation, of application Ser. No. 08/031,054, filed Mar. 12, 1993, now abandoned, which is a continuation of application Ser. No. 07/922,124, filed Jul. 29, 1992, now abandoned, which is a continuation-in-part of application Ser. No. 07/865,579, filed Apr. 9, 1992, now U.S. Pat. No. 5,281,679, which is a continuation-in-part of application Ser. No. 07/788,972, filed Nov. 7, 1991, now abandoned.

FIELD OF THE INVENTION

This invention relates to catalysts, to methods of olefin polymerization, to polymers, and to products made thereof. This invention particularly relates to mixed metallocene catalysts and methods of controlling the molecular weight distribution of a polymer by controlling the chemistry of the polymerization catalyst.

BACKGROUND OF THE INVENTION

Olefin polymerization catalysts comprising a metallocene and an aluminum alkyl component were first proposed in about 1956. Australian patent 2436/88 proposed for use as a polymerization catalyst a bis(cyclopentadienyl) titanium, zirconium, or vanadium salt reacted with various aluminum alkyl compounds. Although some of these catalyst complexes were capable of polymerizing ethylene, the level of catalytic activity was insufficient for commercial uses.

Later it was found that certain metallocene catalyst systems such as bis-(cyclopentadienyl) titanium or zirconium dialkyls in combination with aluminum alkyl and water cocatalyst formed catalyst systems for the polymerization of ethylene. Such catalyst systems have been discussed in German Patents DE 2,608,863 and DE 2,608,933 both published on Sep. 9, 1977 and European Patent Application No. 0035242 published Sep. 9, 1991, however, these catalyst systems are commercially useful for the polymerization of ethylene and can control the molecular weight of a polymer product, other than by the addition of hydrogen, by controlling the reaction temperature or the amount of cocatalyst.

Further, in order to realize the benefits of such catalyst systems, one must use or produce the required cocatalyst component, alumoxane, which is produced by reacting an aluminum alkyl with water. The reaction of an aluminum alkyl with water is very rapid and highly exothermic because of the pyroforic nature of this reaction.

Alumoxane as a cocatalyst component has been separately prepared by one of two general methods. Alumoxanes may be prepared by adding extremely finely divided water, such as in the form of a humid solvent, to a solution of aluminum alkyl in benzene, other aromatics, or aliphatic hydrocarbons. The production of alumoxane by such procedures requires the use of explosion-proof equipment and extreme care in monitoring reaction conditions in order to reduce potential fire and explosion hazards. For this reason, it has been preferred to produce alumoxane by reacting aluminum alkyl with a hydrated salt, such as hydrated copper sulfate.

Several commonly-owned U.S. patents have addressed the above problems in the prior art, for example, U.S. Pat. Nos. 4,912,075, 4,937,301, 4,925,821, 4,937,217, 4,935,397 and 5,006,500, all of which are hereby fully incorporated by reference.

U.S. Pat. No. 5,006,500 describes procedures by which an alumoxane is safely produced directly on a silica support by reacting an alkyl aluminum with water-containing silica. Such alumoxane-silica product is then reacted with a metallocene to yield a supported metallocene-alumoxane catalyst useful in the polymerization of olefins. However, homogeneous catalyst components comprising titanium and zirconium metallocenes produce polymers, polyethylenes, having a typically narrow molecular weight distribution (MWD), i.e. $M_w/M_n$.

The above cited references neither disclose polyethylenes having a broad molecular weight distribution nor how to obtain such polyethylenes. Although there are many commercial applications for polyolefins with a narrow molecular weight distribution as a desirable property, for example to ease the process ability of polyolefins into finished a form, it is often desirable to have a polyolefin with a broader molecular weight distribution.

Several methods in the past have been directed toward making broader molecular weight distribution polyolefins. U.S. Pat. No. 4,310,648 discloses a catalytic reaction product of a titanium compound, a zirconium compound, an organomagnesium compound and a halide source. The reaction product (a heterogeneous catalyst), when employed in combination with aluminum alkyl, is useful for the production, at high activity, of broad molecular weight polyethylenes.

It is sometimes also desirable to have a polyethylene having a narrow molecular weight distribution and a high molecular weight. For example, U.S. Pat. No. 4,361,685 discloses the use of organic soluble chromium and zirconium compounds employed in combination with a supported catalyst system comprising an organometallic activating agent and a trivalent or tetravalent titanium compound. The polymers obtained have a high molecular weight and a narrow molecular weight distribution.

In "Molecular Weight Distribution And Stereoregularity Of Polypropylenes Obtained With Ti(OC$_4$H$_9$)$_4$Al$_2$(C$_2$H$_3$)$_3$ Catalyst System"; Polymer, Pg. 469–471, 1981, Vol. 22, April, Doi, et al. disclose propylene polymerization with a catalyst, which at about 41° C. obtains a soluble catalyst and an insoluble catalyst fraction, one with a "homogeneous catalytic centre" and the other with a "heterogeneous catalytic centre". The polymerization at that temperature obtains polypropylene having a bimodal molecular weight distribution. Also, U.S. Pat. No. 4,931,417 describes the use of bis(methyl-t-butyl cyclopentadienyl) zirconium dichloride to obtain atactic polypropylene.

U.S. Pat. No. 4,808,561 discloses a metallocene polymerization catalyst having cyclopentadienyl rings substituted with hydrocarbyl groups such as alkyl, aryl, alkylaryl, or arylalkyl groups. However, this patent does not teach a method of making broader molecular weight distribution polyolefins.

U.S. Pat. No. 4,935,474 discloses a method of obtaining polyethylene having a broad molecular weight distribution utilizing a catalyst comprising (a) at least two different metallocenes each having different propagation and termination rate constants for ethylene polymerizations and (b) an alumoxane. However, this U.S. Patent does not disclose or suggest a method of controlling the value of molecular weight distribution.

In spite of the methods known in the past for polymerizing broader molecular weight distribution polyolefins, there still exists a need in the art for an improved catalyst system and methods for making high quality polyolefins which also provide control over the broadened molecular weight distribution.

SUMMARY OF THE INVENTION

The present invention is directed toward the polymerization of alpha-olefins, optionally with a comonomer, in the presence of an improved catalyst system and process where the broadened molecular weight distribution of the polymer produced can be controlled. and to methods of making the improved catalyst system.

The catalyst system of the present invention comprises a first component comprising at least one transition metal metallocene having at least one cyclopentadienyl ring that is substituted with a first substituent, which is a hydrocarbon substituent having a 2° (secondary) or 3° (tertiary) carbon atom through which it is covalently bonded to the at least one cyclopentadienyl ring in the system, a second component comprising at least one transition metal metallocene having at least one second cyclopentadienyl ring substituent that is substituted with a second substituent that is hydrogen or optionally a second hydrocarbon substituent different from the first substituent; and an activator selected from ionic activators or alumoxane or combinations thereof, wherein the ratio between the first and second metallocene component controls the molecular weight distribution of the polymer product. As a caveat, the final molecular weight distribution will be some value between the highest and the lowest molecular weight distribution that each substituent would produce if used alone.

By practicing the process of this present invention, in one embodiment, ethylene is polymerized to produce high molecular weight polyethylenes such as linear low density polyethylene (LLDPE) and high density polyethylene (HDPE) polymers having broadened molecular weight distributions with improved mechanical, physical and/or chemical properties. The polymers produced by this present invention are intended for fabrication into articles by, for example, extrusion, injection molding, thermoforming, rotational molding, and the like.

According to one embodiment of the present invention, at least one monomer of an alpha-olefin is polymerized, preferably in, but not limited to, a gas-phase reactor, in the presence of a supported catalyst system having at least one transition metal metallocene selected from Group IVB or Group VB metals of the Periodic Table of Elements. The process of this invention is suitable for use in slurry or solution reactors with an unsupported or a supported catalyst system as well as gas phase reactors. In the preferred embodiment of the present invention, the first hydrocarbon substituent is an alkyl having about 3 to about 20 carbon atoms and has a 2° or 3° carbon atom with which it is covalently bonded to the at least one cyclopentadienyl ring of the first component.

DETAILED DESCRIPTION OF THE INVENTION

The present invention is directed towards the polymerization of alpha-olefins, optionally with comonomer, using an improved catalyst system that comprises a first component and second component both comprising at least one transition metal metallocene having at least one cyclopentadienyl ring that is substituted with a hydrocarbon substituent, wherein the first component has a hydrocarbon substituent having a 2° (secondary) or 3° (tertiary) carbon atom through which it is covalently bonded to the cyclopentadienyl ring of the first component in the system. The second component in the system is substituted with hydrogen or optionally a hydrocarbon substituent different from the hydrocarbon substituent of the first component, a second component comprising at least one transition metal metallocene having at least one second cyclopentadienyl ring substituent that is substituted with a second substituent that is hydrogen or optionally a second hydrocarbon substituent different from the first substituent. The catalyst components can be activated by ionic activators or alumoxane or combinations thereof. The molecular weight distributions of the polymers produced are controlled by the ratio between the first and second metallocene components.

The improved catalyst system of the present invention is referred to as a "mixed" catalyst system and may comprise one or more transition metal metallocenes, the first or second components. "Mixed" as used herein, refers to a catalyst system which utilizes two or more types of transition metal metallocene components where each transition metal metallocene component has at least one cylopentadienyl ring. The transition metal of the metallocenes can be the same or different. Also, two transition metal metallocenes components, each with different cyclopentadienyl ring substituents is a "mixed" catalyst system, as is the improved catalyst system of this present invention.

The mixed systems contemplated by this present invention may be obtained by either physical mixing, chemical mixing or chemical synthesis.

"Physical mixing" refers to physically mixing or blending two or more different types of supported or unsupported catalysts, for example, catalysts having different transition metals and/or different cyclopentadienyl ring substituents) for a mixture containing a mixture of supported catalysts. Specifically, the first catalyst component is prepared independently from the second catalyst component, then the two components are "physically" mixed together.

"Chemical mixing" refers to mixing or blending two or more different types of supported catalysts. In particular, "chemical mixing" requires the mixing of at least two transition metal metallocene compounds first before introducing the support. As a result, the metallocene compounds are supported on the same support. This is different from the "physical mixing" where the metallocene components are each supported separately and independently on different supports.

"Synthesis mixing" refers to the substitution of different cyclopentadienyl ring substituents on one transition metal metallocene catalyst component. Thus, "synthesis mixing" describes a metallocene component having at least one cyclopentadienyl ring with at least two different substituents bonded to the at least one cyclopentadienyl ring or a metallocene component having at least two cyclopentadienyl rings where each ring is substituted by a different substituent. These forms of components must be carefully synthesized prior to their use and hence the name "synthesis mixing".

The transition metal metallocene components utilized in the process of this present invention may be any of the organometallic coordination compounds obtained as a cyclopentadienyl derivative of the Group IVB and/or Group VB transition metals. Metallocenes which are useful for preparing an active catalytic complex according to the process of this invention are the mono-, bi- and tri- cyclopentadienyl metal compounds and most preferably, bis-cyclopentadienyl compounds. Also suitable are bridged cyclopentadienyl compounds. Further, the improved catalyst system of the present invention has a metallocene component that comprises at least one transition metal metallocene wherein at least one cyclopentadienyl ring in the system is substituted with a first hydrocarbon substituent that functions as a molecular broadening substituent. This hydrocarbon substituent has a 2° or 3° carbon atom through which it is covalently bonded to the cyclopentadienyl ring. In addition, the improved catalyst system of this present invention has another metallocene component, which has at least one cyclopentadienyl ring substituted with a second cyclopentadienyl ring substituent different from the first ring substituent of the first component. Preferred metallocenes are the bis (cyclopentadienyl) Group IVB transition metal compounds wherein at least one of the cyclopentadienyl groups of the catalyst system of the present invention is substituted with a hydrocarbon group by covalent bonding through its 2° or 3° carbon atom.

Examples of catalyst systems particularly useful in the process of this invention comprise one or more metallocenes represented by the general formulas:

I. $(C_5R'_k)_g R''_s (C_5R'_k) MQ_{3-g}$, and

II. $R''_s (C_5R'_k)_2 MQ'$ wherein $(C_5R'_k)$ is a substituted cyclopentadienyl, M is a Group IVB or VB transition metal and preferably a Group IVB transition metal, each group R' is H or an optionally substituted hydrocarbon group with at least a first substituent R' in the catalyst system being a hydrocarbon substituent comprising a 2° or 3° carbon atom with which it is bonded to the cyclopentadienyl group, with a second substituent R' group in the catalyst system being different than the first substituent R' group, with the second substituent R' group and the remainder R' groups being hydrogen or hydrocarbyl radical such as alkyl, alicyclic, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4$–$C_6$ ring, R'' is $C_1$–$C_4$ alkylene radical, a dialkyl germanium or silicon, or an alkyl phosphine or amine radical bridging any one pair of the $(C_5R'_k)$ rings, Q is a hydrocarbyl radical such as aryl, alkyl, alicyclic, alkenyl, alkylaryl, or arylalkyl having 1–20 carbon atoms, hydrocarboxyl radical having 1–20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0 and M is as defined above.

Exemplary hydrocarbyl radicals are methyl, ethyl, propyl, butyl, amyl, isoamyl, hexyl, cyclohexyl, isobutyl, heptyl, octyl, nonyl, decyl, cetyl, ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary alkylidene radicals are methylidene, ethylidene and propylidene.

Of the metallocenes, hafnocenes, zirconocenes and titanocenes are most preferred.

Examples of suitable preferred catalyst systems comprising bis(cyclopentadienyl) Group IVB transition metal compounds wherein at least one of the cyclopentadienyl rings of the system has a first substituent hydrocarbon group covalently bonded to the ring through a 2° or 3° carbon atom, and wherein at least one of the cyclopentadienyl rings of the system has a second substituent different from the first substituent, are represented by the following general formulas:

III. $(A\text{-}Cp)MX_1X_2$

IV. $(A\text{-}CP) MX'_1X'_2$

V. $(A\text{-}Cp) MJ$

VI. $(Cp^*) (CpR)MX_1$ wherein "Cp" represents a cyclopentadienyl radical which may be substituted or unsubstituted, and:

(A-Cp) is either $(Cp)(Cp^*)$ or Cp-A'-Cp* and Cp and Cp* are the same or different cyclopentadienyl ring substituted with from one to five substituent groups R, with at least one first substituent R group in the catalyst system being a molecular weight distribution broadening or tensile impact strength enhancing substituent comprising a 2° or 3° carbon atom with which it is bonded to the cyclopentadienyl group, with at least one second substituent R group being different from the first substituent R group, with the second substituent R group and each remainder group R being independently, a radical which can be hydrocarbyl, halocarbyl, substituted halocarbyl, hydrocarbyl-substituted organometalloid, or halogen, or Cp and Cp* are a cyclopentadienyl ring, with at least one group R on the metallocene compound being a molecular weight distribution broadening or tensile impact strength enhancing substituent comprising a 2° or 3° carbon atom with which it is bonded to the cyclopentadienyl ring, with a second substituent R group being different than the first substituent R group, and in which two of the remainder adjacent R groups are joined forming a $C_4$ to $C_{20}$ ring to give a saturated or unsaturated polycyclic cyclopentadienyl ligand such as indenyl, tetrahydroindenyl, fluorenyl, or octahydrofluorenyl and A' is a covalent bridging group which restricts rotation of the two Cp-groups, M is titanium, zirconium or hafnium; J is an olefin, diolefin or aryne ligand; $X_1$ and $X_2$ are, independently, selected from the group consisting of hydride radicals, hydrocarbyl radicals having from 1 to about 20 carbon atoms, substituted-hydrocarbyl radicals having from 1 to about 20 carbon atoms, wherein one or more of the hydrogen atoms are replaced with a halogen atom, organometalloid radicals comprising a Group IV-A element wherein each of the hydrocarbyl substitutions contained in the organic portion of said organometalloid, independently, contain from 1 to about 20 carbon atoms and the like; $X'_1$ and $X'_2$ are joined and bound to the metal atom to form a metallacycle, in which the metal atom, $X'_1$, and $X'_2$ form a hydrocarbocyclic ring containing from about 3 to about 20 carbon atoms; and R is a substituent, preferably a hydrocarbyl substituent, on one of the cyclopentadienyl radicals which is also bound to the metal atom.

Each carbon atom in the cyclopentadienyl radical ("Cp") may be, independently, unsubstituted or substituted with the same or a different radical selected from the group consisting of hydrocarbyl radicals, substituted-hydrocarbyl radicals wherein one or more hydrogen atoms is replaced by a halogen atom, hydrocarbyl radicals in which adjacent substituents are joined to form a ring of 4 to 10 or more carbon atoms, hydrocarbyl-substituted metalloid radicals wherein the metalloid is selected from Group IV or V of the Periodic Table of the Elements, and halogen radicals. Suitable hydrocarbyl and substituted-hydrocarbyl radicals, which may be substituted for at least one hydrogen atom in a cyclopentadienyl radical, contain from 1 to about 20 carbon atoms and include straight and branched alkyl radicals, cyclic hydrocarbon radicals, alkyl-substituted cyclic hydrocarbon radicals, aryl substituted radicals and alkyl aryl-substituted radicals. Similarly, and when $X_1$ and/or $X_2$ is a hydrocarbyl or substituted-hydrocarbyl radical, each may, independently, contain from 1 to about 20 carbon atoms and be a straight or branched alkyl radical, a cyclic hydrocarbyl radical, an alkyl-substituted cyclohydrocarbyl radical, an aryl radical or an alkyl-substituted radical. Suitable organometalloid radicals include mono-, di- and tri- substituted organometalloid radicals of Group IV or V elements wherein each of the hydrocarbyl groups contain from 1 to about 20 carbon atoms. More particularly, suitable organometalloid radicals include trimethylsilyl, triethylsilyl, ethyldimethylsilyl, methyldiethylsilyl, triphenylgermyl, trimethylgermyl and the like.

Hydrocarbon substituents suitable as the molecular weight distribution broadening substituent or the "first hydrocarbon substituent" group are generally any optionally substituted hydrocarbon having from about 3 to about 20 carbon atoms that comprises a 2° or 3° carbon atom with which it is covalently bonded to the cyclopentadienyl ring. Suitable hydrocarbons include, for example, alkyl, alkenyl, aryl, alicyclic alkylaryl, or arylalkyl groups. The designation "2° or 3° carbon atom" refers to the classification of the carbon atom if the substituent were a carbonium ion not bonded to the cyclopentadienyl carbon atom. Of course once the substituent is covalently bonded to the cyclopentadienyl group, the classification of the carbon atom changes (increases in degree), however, the designation "2° or 3° carbon atom" is still utilized and refers to the substituent in its carbonium ion state and not its covalently bonded state. Preferably, the substituent is an alkyl having from about 3 to about 20 carbon atoms and comprising a 2° or 3° carbon atom with which it is covalently bonded to the cyclopentadienyl ring. More preferably, the substituent is an alkyl having from about 3 to about 7 carbon atoms having a 2° or 3° carbon atom with which it is covalently bonded to the cyclopentadienyl ring. Most preferably, the substituent is an alkyl having from about 3 to about 5 carbon atoms and comprising a 2° or 3° carbon atom with which it is covalently bonded to the cyclopentadienyl ring. Exemplary substituents as the molecular weight distribution broadening substituent that comprise a 2° or 3° carbon atom, but not limited to, include tertiary butyl, isopropyl, and 2° pentyl substituents. The tertiary butyl group comprises a 3° carbon atom at the 2nd position, and the isopropyl group comprises a 2° carbon atom at the 2nd position, with which they are respectively bonded to the cyclopentadienyl ring of the metallocene component. For the purposes of the description of this invention, the term "2° pentyl substituent" is intended to mean a pentyl group covalently bonded, or able to be bonded at any of the three middle carbons of the n-pentyl group. Preferably, the carbon atom at the 3rd position is used to connect the n-pentyl group to the cyclopentadienyl ring.

Methods of substituting hydrocarbon substituents onto a cyclopentadienyl ring of a metallocene are well known, and any suitable method may be utilized. Such methods include that of Wailes, et al., "*Organometallic Chemistry of Titanium, Zirconium and Hafnium*" (1974), herein incorporated fully by reference.

Generally, such methods involve a salt of the cyclopentadienyl compound, such as a lithium or sodium salt, that is reacted with a halogen substituted substituent. The halogen is removed from the carbon atom of the substituent by lithium or sodium and this carbon atom then covalently bonds to the cyclopentadienyl ring. For the present invention, this means that the halogen is substituted on the 2° or 3° carbon atom. In the reaction, the halogen forms a salt with the lithium or sodium, and the substituent is substituted onto the cyclopentadienyl ring connected by the 2° or 3° carbon atom. The substituted cyclopentadienyl is then recovered from the reaction mixture.

The active catalyst complex system of the present invention may also include a metallocene and an alumoxane cocatalyst formed on the surface of a silica which then serves as support material or an ionic compound may be reacted with a metallocene to form an active catalyst system.

While not wishing to be bound by theory, alumoxanes are oligomeric aluminum compounds represented by the general formula $-(R-Al-O)_y$, which may be a cyclic compound and $R(R-Al-O-)_yAlR_2$, which may be a linear compound. In the general formula, "R" is a $C_1-C_{10}$ alkyl group such as, for example, methyl, ethyl, propyl, butyl, and pentyl and "y" is an integer from 2 to about 30 and represents the degree of oligomerization in the alumoxane. Preferably, R is methyl, and the degree of oligomerization, "y," is about 4 to about 25 and most preferably 6–25. Generally, in the preparation of alumoxanes from, for example, the reaction of methyl aluminum and water, it is believed that a mixture of linear and cyclic compounds is obtained. Generally, an alumoxane having a higher degree of oligomerization will, for a given metallocene, produce a catalyst complex of a higher activity than will an alumoxane having a lower degree of oligomerization. Hence, the procedure by which alumoxane is produced by direct reaction of a alkyl aluminum with an undehydrated silica gel should ensure the conversion of a bulk quantity of the alkyl aluminum to an alumoxane that has a high degree of oligomerization. In accordance with this invention, the desired degree of oligomerization is obtained by the order of addition of reactants as described hereinafter. Whatever species actually results within the material which, for the purposes of this invention, is called alumoxane; it is known that the combination of alkyl aluminum with water, or in some cases, hydroxyl groups, as supplied by alcohol, hydrated materials or bases, result in a mixture which will be effective in the practice of this invention.

Also, EPA Publication 0277003 and 0277004 published on Aug. 3, 1988 and related copending U.S. patent application Ser. Nos. 133,480, filed Dec. 22, 1987, now abandoned and 133,052, filed Dec. 21, 1987, now abandoned, herein all have been incorporated fully by reference, new metallocene based catalyst systems are disclosed. Where before a metallocene was activated to a catalytic state by reacting the metallocene with a conventional Ziegler-Natta cocatalyst, namely a trialkylaluminum, or by reacting the metallocene with an alumoxane. In the new catalyst systems described in the publications and patent applications above, an ionic compound is reacted with a metallocene to form an active catalyst system.

The ionic activator compound for the catalyst system comprises a cation and an anion, the cation being one which is reactable with a non-cyclopentadienyl ligand of the metallocene to yield as the reaction product a neutral ligand derivative, and a cationic metallocene species to which the anion of the activator compound is essentially non-coordinating. The cationic metallocene as associated with the non-coordinating anion is the catalytically active species of the system. The activator compound is comprised of a cation and an anionic carborane, or the ion-exchange activator compound is comprised of a cation and an anionic coordination complex. The cation of the ion-exchange reagents can in general be any cationic species which is capable of reacting with a negatively charged ligand on the transition metal precursor. When the ligand on the transition metal precursor is an alkyl, then cations known to abstract alkyls from early transition metal complexes can be used such as triphenylcarbonium, oxonium, silver (I), and ammonium. The preferable ion-exchange activators are comprised of an acidic ammonium cation and an anionic coordination complex derived from boron having the general formula [LH]+[BArAr'XX'] wherein [LH]+ is a protonated tertiary amine, L is a tertiary amine, Ar, Ar', X, X' are aromatic hydrocarbyl radicals and X and X' may be hydride, halide or hydrocarbyl radicals. As described in copending U.S. patent application Ser. No. 555,977, filed Jul. 19, 1990, now abandoned, and herein incorporated fully by reference, the chemical structure of the catalytically active species is dependent upon the nature of the cation employed in the activator compound and upon the stoichiometric proportions in which the metallocene and activator compound are reacted. In some instances, the metallocene cation generated by the reaction exists as a three coordinate species, $ACpZX_1+$ (where $ACp$ represents two cyclopentadienyl ligands which are bridged or unbridged, the same or different, Z is a Group IVB metal, and $X_1$ is selected from the group consisting of hydride, aryl, hydrocarbyl, halocarbyl, or organic derivatives of organometalloid radicals), although it is possible that the four coordinate species $ACpZX_1(L)+$ (where L is a neutral Lewis base such as tertiary amine or metallocene) can form via the labile coordination thereto of the neutral Lewis base by-product or via a dimeric coordination to a neutral as yet unreacted metallocene. In both forms the metallocene cation is stabilized by ionic association to the non-coordinating anion provided by the activator compound while the neutral coordination ligand, either the neutral Lewis base by-product or a neutral metallocene dimerizing ligand are very labile to displacement by an olefin or other polymerizable monomer.

The catalyst systems as described above are very active for the production of polyolefins without the need to employ quantities of activator compounds in excess of a stoichiometric ratio to the metallocene of 1:1. As noted, the new ionically activated metallocene catalyst systems described above are soluble, for example, homogeneous, systems. However, U.S. patent application Ser. No. 459,921, filed Jan. 2, 1990, now abandoned, herein fully incorporated by reference discloses that these ionically activated metallocene catalysts can be produced in a heterogeneous, for example, supported, form by physical absorption or adsorption of the components thereof onto suitable inorganic oxide support particles.

The improved metallocene-alumoxane catalyst system of the present process may be prepared by any of the methods well known prior art, for example, U.S. Pat. No. 4,701,432, 4,808,561, 4,912,075, 4,925,821 and 5,008,228 all are hereby fully incorporated by reference. Such methods include preparing the alumoxane component of the active catalyst complex separately then adding it to a catalyst support material which is then treated with a metallocene to form an active catalyst complex. One procedure heretofore employed for preparing the alumoxane separately is that of contacting water in the form of a moist solvent with a solution of aluminum trialkyl in a suitable organic solvent such as benzene, other aromatics, or aliphatic hydrocarbons. As before noted this procedure is attended by fire and explosion hazards which requires the use of explosion-proof equipment and carefully controlled reaction conditions.

Another method for preparing the metallocene-alumoxane catalyst system of the present process involves contacting the aluminum alkyl with the metallocene followed by the addition of wet silica.

In an alternative known method heretofore employed for the separate production of alumoxane, an aluminum alkyl is contacted with a hydrated salt, such as hydrated copper sulfate. This method comprised treating a dilute solution of aluminum alkyl in, for example, toluene, with a copper sulfate pentahydrate. A slow, controlled hydrolysis of the aluminum alkyl to alumoxane results which substantially eliminates the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Correspondingly, the use of a separately produced alumoxane greatly increases the cost of producing a metallocene alumoxane catalyst.

Further, U.S. patent application Ser. No. 885,170 filed May 18, 1992, now U.S. Pat. No. 5,240,894 herein fully incorporated by reference describes yet another method for producing a supported metallocene catalyst system contemplated by this present invention. This particular method involves forming a metallocene/alumoxane solution, then adding a support, evaporating the slurry and desolvating the supported catalyst to remove any residual solvent trapped in the pores of the support.

The metallocene-alumoxane catalyst system of the present invention is prepared by direct reaction of an aluminum trialkyl with the material utilized as the catalyst support, namely a "wet" silica gel. Wet silica gel generally comprises undehydrated silica gel and/or water impregnated silica gel.

Undehydrated silica gel useful as the catalyst support is that which has a surface area in the range of about 10 to about 700 $m^2/g$, the upper side of the range may also be about 500 $m^2/g$ or about 400 $m^2/g$. The lower side of the range may be about 100 $m^2/g$ or about 200 $m^2/g$. The silica also has a pore volume of about 3 to about 0.5 cc/g and preferably 2-1 cc/g, and an adsorbed water content of from about 0.5 to about 10 weight percent. The particle size of the silica should be from about 10 μm to about 100 μm, and preferably from about 30 μm to about 60 μm.

Water-impregnated silica gel useful as the catalyst support is that which has a surface area in the range of from about 10 to about 700 m$^2$/g, the upper side of the range may also be from about 500 m$^2$/g or about 400 m$^2$/g, with the lower side of the range from about 100 m$^2$/g or about 200 m$^2$g. The gel also has a pore volume of about 3 to about 0.5 cc/g and preferably 2-1 cc/g, and an adsorbed water content of from about 10 to about 50 weight percent, with the upper range about 35 or 40, and a lower range of from about 20 or 35. The particle size of the silica should be from an upper range of from about 60 μm or about 100 μm and a lower range of from about 10 μm or about 30 μm.

Water-impregnated silica gel may be formed by adding sufficient water to commercially available silica gel (Davison 948) to create an aqueous slurry. Because silica gel possesses many fine pores, it is extremely adsorbent and will rapidly become saturated. Once the aqueous slurry is formed, excess water can be removed by filtration, followed by air drying, or only air drying, to a free flowing powder state. Drying at elevated temperatures is not recommended because it could substantially decrease the amount of adsorbed water.

Wet silica gel, as defined above, is slowly added over time, to a stirred solution of aluminum trialkyl, preferably trimethyl aluminum or triethyl aluminum, in an amount sufficient to provide a mole ratio of aluminum trialkyl to water of from about 3:1 or 2:1 to about 1:2 or 0.9:1. Also suitable for use as the aluminum trialkyl are tripropyl aluminum, tri-n-butyl aluminum, tri-isobutyl aluminum, tri(2-methylpentyl) aluminum, trihexyl aluminum, tri-n-octyl aluminum, and tri-n-decyl aluminum. The solvents used in the preparation of the catalyst system are inert hydrocarbons, in particular a hydrocarbon that is inert with respect to the catalyst system. Such solvents are well known and include, for example, isobutane, butane, pentane, hexane, isohexane, heptane, octane, cyclohexane, methylcyclohexane, toluene, xylene and the like.

Upon addition of the wet silica gel to the solution of aluminum trialkyl, the water content of the silica gel controllably reacts with the aluminum trialkyl to produce an alumoxane which is deposited onto the surface of the silica gel particles. Although the reaction of the aluminum trialkyl with the water content of the silica gel proceeds relatively quickly, it does not occur with the explosive speed of that which occurs with free water. The reaction may be safely conducted in conventional mixing equipment under a mantle of inert gas.

Once the alumoxane-silica component has been formed, a metallocene may be added to the slurried suspension of alumoxane-silica gel product to form the metallocene-alumoxane catalyst, or the alumoxane silica component may be additionally processed to further enhance the ultimate catalytic activity of the formed catalyst.

Further processing would comprise drying the slurried suspension to remove the excess liquid, preferably drying the alumoxane-silica component to a powder, followed by reslurrying the alumoxane-silica component with a hydrocarbon solvent that is inert with respect to the alumoxane-silica component, such as for example isobutane, butane, isopentane, pentane, isohexane, hexane, heptane, octane, cyclohexane, methylcyclohexane, toluene, xylene and the like.

Once the suspension of alumoxane-silica gel is formed, either initially, or after reslurrying with the additional processing, a metallocene is added to the suspension of alumoxane silica gel product in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 30 minutes to about one hour at ambient or an elevated temperature of about 75° C. to permit the metallocene to undergo complete complexing reaction with the adsorbed alumoxane. Thereafter, the solvent is removed and the residual solids are dried, preferably at a temperature of 75° C. or greater, to a free flowing powder. The free flowing powder comprises a silica gel supported metallocene alumoxane catalyst complex of sufficiently high catalytic activity for use in the gas phase polymerization of olefins by conventional gas phase polymerization procedures.

By appropriate selection of the type and relative amounts of the metallocene and the aluminum trialkyl cocatalyst precursor, one can attain by the present method the particular active catalyst complex desired for any particular application. For example, higher concentrations of alumoxane in the catalyst system generally result in higher molecular weight polymer product. For most applications the ratio of aluminum in the aluminum alkyl to total metal in the transition metal metallocene can be in the range of from 1500:1, about 1000:1 or about 250:1, to about 1:1500 to about 1:1, or about 5:1.

Following the addition of the metallocene to the alumoxane adsorbed on the silica gel solids, the solvent is removed by filtering or evaporation, and the residual solids are dried to a free flowing powder. Drying of the residual solids may be conducted at a temperature up to about 85° C., and preferably at a temperature of about 75° C. The dried free flowing powder comprises a metallocene alumoxane complex adsorbed upon the surface of the silica gel support particles. The dried state composition exhibits a level of catalytic activity useful for gas phase polymerization of olefins.

The monomers that may be polymerized in the process of the present invention are selected from among cyclic or acyclic alpha-olefins and cyclic or acyclic polyenes.

Suitable alpha-olefins include those such as ethylene, propylene, 1-butene, 1-pentene, 1-hexene and 1-octene, 1-decene, 1-dodecene, 1-tetradecene, 1-hexadecene, 1-octadecene, 1-eicesene, and 4-methyl-1-pentene. These may be polymerized either alone or in combination. Preferably, ethylene is polymerized either alone or with at least one alpha-olefin having 3 or more carbon atoms.

In addition, the present invention may be utilized for the copolymerization of an alpha-olefin with a polyene. The polyene utilized in the present invention generally has in the range of 3 to about 20 carbon atoms. Preferably, the polyene has in the range of from about 4 to about 20 carbon atoms, most preferably in the range of from about 4 to about 15 carbon atoms. Preferably, the polyene is a diene with a double bond in the alpha position and generally has in the range of 3 to about 20 carbon atoms. Preferably, the diene utilized in the present invention is a straight chain, branched chain or cyclic hydrocarbon diene preferably having from about 4 to about 20 carbon atoms, and most preferably from about 4 to about 15 carbon atoms, and still most preferably in the range of about 6 to about 15 carbon atoms. Most preferably, the diene is a non conjugated diene. Examples of suitable dienes are straight chain acyclic dienes such as: 1,3-butadiene, 1,4-pentadiene, 1,4-hexadiene, 1,6-octadiene, 1,7-octadiene, 1,8-nonadiene and 1,9-decadiene; branched chain acyclic dienes such as: 5-methyl-1,4-hexadiene, 3,7-dimethyl-1,6-octadiene, 3,7-dimethyl-1,7-octadiene and mixed isomers of dihydromyricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicyclopentadiene, bicycle-(2,2,1)-heaped-2-5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2norbornene, 5-vinyl-2-norbornene and norbornene. Of the dienes typically used to prepare EPR's, the particularly preferred dienes are 1,4-hexadiene, 5-ethylidene-2-norbornene, 5-vinylidene-2-norbornene, 5-methylene-2-norbornene and dicyclopentadiene. The especially preferred dienes are 5-ethylidene-2-norbornene and 1,4-hexadiene.

The polymer of the present invention will have a density in the range of from about 0.89 to about 0,965 g/cm$^3$, preferably in the range of from about 0.89 to about 0.93 g/cm$^3$.

Specific methods for making ethylene/alpha-olefin copolymers, and ethylene/alpha-olefin/diene terpolymers are described in U.S. Pat. No. 4,871,705 to Hoel, and in U.S. application Ser. No. 594,776, filed Oct. 9, 1990, now U.S. Pat. No. 5,229,478 to Floyd, et al., respectively, both hereby fully incorporated by reference.

In the process of the present invention, the polymerization may be conducted by a solution, slurry, or gas-phase technique, generally at a temperature in the range of from about 0° C. to about 200° C., or even higher, and under atmospheric, subatmospheric, or superatmospheric pressure conditions; and conventional polymerization adjuvants, such as hydrogen may be employed if desired. Preferably, the process of the present invention utilizes gas phase polymerization. It is generally preferred to use the catalyst compositions at a concentration such as to provide at least about 0.000001 percent, most preferably at least about 0.00001 percent by weight of transition metal based on the weight of the monomer(s), in the polymerization of ethylene, alone or with one or more higher olefins. The upper limit of the percent by weight of transition metal present is determined by catalytic activity and process economics.

A slurry or solution polymerization process can utilize sub- or superatmospheric pressures and temperatures in the range of from about 40° C. to about 110° C. In a slurry polymerization, a suspension of solid, particulate polymer is formed in a liquid polymerization medium to which ethylene, alpha-olefin comonomer, hydrogen and catalyst are added. The liquid employed as the polymerization medium can be an alkane or a cycloalkane, such as butane, pentane, hexane, or cylclohexane, or an aromatic hydrocarbon, such as toluene, ethylbenzene or xylene. The medium employed should be liquid under the conditions of the polymerization and relatively inert. Preferably, hexane or toluene is employed.

A gas phase polymerization process utilizes superatmospheric pressure and temperatures in the range of from about 50° C. to about 120° C. Gas phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of about 50° C. to about 120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, residual monomer can be removed with a nitrogen purge, and used without further deactivation or catalyst removal.

Molecular weight distribution (MWD), polydispersity, or ($M_w/M_n$) are generally synonymous and are useful indicators of processability as well as indicators of molecular structure. Generally as MWD increases, the processability of the polymer increases. Also, generally as MWD increases some of the polymer characteristics will degrade, conversely as MWD decreases, generally, some polymer properties will increase while the processability will decrease, an example of this would be the polymer strength.

These general trends may be altered in some cases such as, for example, the instances in which the MWD is multi-modal as described in U.S. Pat. No 4,530,914 to Ewen, et al. Since MWD is essentially an average over a range, a polymer displaying a multi-modal distribution may offer a high molecular weight, good processability, and yet still retain good strength in the resulting polymer. For these reasons, it is likely that polymers having upper limits in the higher ranges of MWD, such as, for example, above 3, preferably in the range of above 3 to 100 and higher, when obtained by the practice of this invention, may have useful properties as well as being easy to process.

In accordance with the process of the present invention, polymer is obtained with a broadened molecular weight distribution as compared to polymer obtained utilizing known catalysts at same or similar polymerization conditions. Generally the polymer will have a molecular weight distribution greater than 4. Preferably, the polymer will have a molecular weight distribution greater than 5, and more preferably greater than about 6, and most preferably greater than about 8.

The polymer obtained in the present process can be extruded into water and cut into pellets or other suitable comminuted shapes. Pigments, antioxidants, fillers, stabilizers, processing aids, and other additives, as are known in the art, may be added to the polymer.

The polymers produced by the process of the present invention are capable of being fabricated into a wide variety of articles, as is known for homopolymers of ethylene and copolymers of ethylene and higher alpha-olefins, including films and molded articles and the like.

According to the process of the present invention, the molecular weight distribution of the polymer produced may be controlled by varying the types of substituents on the cyclopentadienyl rings of the improved catalyst system. The molecular weight distribution of the polymer formed by the present invention using the improved catalyst system of the present invention which can have two or more substituents on the cyclopentadienyl rings of the system will depend upon the molecular weight distribution that such substituents would produce if utilized alone. Generally, the molecular weight distribution will be somewhere between the high and the low molecular weight distribution values that such substituents would produce if utilized alone. For example, if the first substituent would produce a polymer having a molecular weight distribution of about 6 and the second substituent would produce a polymer having a molecular weight distribution of about 2, the resulting polymer made from a catalyst system having the first and second substituents would have a molecular weight distribution between 2 and 6. Control can be established by varying the ratio of the first hydrocarbon substituent to the second hydrocarbon substituent in the catalyst system. With multiple hydrocarbon substituents on the cyclopentadienyl rings of the catalyst system, the resulting polymer will have a molecular weight distribution somewhere between the highest and lowest molecular weight distribution value for the substituents were they used alone.

REFERENTIAL EXAMPLES

In order to provide a better understanding of the present invention including representative advantages thereof, the following referential examples are offered as related to actual tests performed in the practice of this invention, and illustrate the surprising and unexpected results obtained from using the improved catalyst system of this present invention and are not intended as a limitation on the scope of the invention.

EXAMPLE 1

Preparation of Support

Davison 948 silica (150 g, LOI 9.4%) was slowly added to a 10 wt % solution of trimethyl aluminum (TMA) in isopentane (1077 cm$^3$). The reaction temperature during silica addition was kept at −5° C. After complete addition of the silica, the temperature was raised to 30° C. and held for 1 hour. The solvent was then removed under reduced pressure until a free-flowing powder was obtained. This was saved and used as stock of support material.

Supporting (n-PrCp)$_2$ZrCl$_2$ on TMA-treated Silica

A sample of the support material so described above (30 g) was suspended in 150 cm$^3$ heptane in a reaction flask equipped with a dropping funnel containing 0.76 grams of (n-PrCp)$_2$ZrCl$_2$ in 20 cm$^3$ toluene. The set-up was maintained at 60° C. during the addition of the metallocene and held for 1 hour after complete addition of the metallocene. The solvents were then removed under reduced pressure to give a free-flowing powder. This catalyst had 0.6 wt % Zr loading.

Polymerization Test

The supported catalyst described above was used in gas-phase polymerization in the following manner and the results are summarized in Table 1.

Ethylene was co-polymerized with 1-butene in a fluid-bed reactor at 65° C. During the polymerization, monomer feeds, hydrogen concentration and reactor pressure were kept constant. The gas velocity through the reactor was 0.7 ft/s. Catalyst was fed into the reactor at a rate that periodically brings the bed height in the reactor up to a set value for product discharge. Samples were taken and analyzed after at least three bed turnovers to determine the properties of the polymer made.

EXAMPLE 2

Supporting (t-BuCp)$_2$ZrCl$_2$ on TMA-treated Silica

This catalyst was prepared in a manner similar to that described above in Example 1. The following quantities were used: 64.27 g of TMA-treated silica was suspended in 200 cm$^3$ heptane at 60° C. and 1.69 g of (t-BuCp)$_2$ZrCl$_2$ dissolved in 45 cm$^3$ toluene was slowly added to the slurry. Stirring was continued for 1 h after the metallocene solution had been added. The solvents were removed under reduced pressure at 60° C. to give a free-flowing powder.

This supported (t-BuCp)$_2$ZrCl$_2$ catalyst was then tested for ethylene/1-butene co-polymerization in a manner similar to that used in Example 1.

EXAMPLE 3

Preparation of Supported (n-PrCp)(t-BuCp)ZrCl$_2$ Catalyst

In a 500 cm$^3$ reaction flask equipped with a dropping funnel and a mechanical stirrer, n-BuLi (71 cm$^3$ of 1.6M solution in hexanes) was slowly added to a solution of t-BuCp (13.61 g, 0.112 mol) in THF (130 cm$^3$). The resulting mixture was stirred at ambient temperature for 3 hours and then added slowly to ZrCl$_4$ (26.1 g, 0.112 mol) in 100 cm$^3$ THF at −78° C. The reaction mixture was allowed to slowly warm up to room temperature over 15 hours.

A lithiated salt of nPrCp was prepared in a separate 500 cm$^3$ reaction flask by slowly adding 71 cm$^3$ solution of 1.6M n-BuLi in hexanes to a solution of n-PrCp (12.1 g, 0.112 mol) in 100 cm$^3$ THF. After 3 hours reaction time at ambient temperature, the lithiated n-PrCp salt was slowly added to the reaction product of the t-BuCp$^-$Li$^+$ and ZrCl$_4$ prepared as described above and cooled to −78° C. After complete addition of the n-PrCp$^-$Li$^+$ salt, the reaction temperature was slowly raised to 23° C. and stirring was continued for a further 15 hours. The volatiles were then removed under reduced pressure and the crude product was extracted in toluene/pentane to afford the pure compound.

A sample of the TEA-treated silica (45.9 g) prepared as in example 1 above was suspended in 100 cm$^3$ heptane at 60° C. (t-BuCp)(n-PrCp)ZrCl$_2$ (1.216 g) dissolved in 40 cm$^3$ toluene was slowly added to the suspension and stirring was continued for 1 h after the metallocene solution had been fully added. The solvents were removed under reduced pressure to give a free-flowing powder.

This catalyst was then used in ethylene/1-butene polymerization as in Example 1 above.

EXAMPLE 4

The supported catalyst described in Example 3 was used in ethylene/1-butene co-polymerization in the following manner. Ethylene was co-polymerized with 1-butene in a semi-batch gas-phase reactor at 85° C. The pressure in the reactor was held constant by continuously feeding 5 mole % mixture of 1-butene in ethylene (Scott Specialty Gases) to compensate for any pressure change due to polymerization. After 1 hour, the polymer was separated from the seed bed material and analyzed for resin density and molecular weight attributes.

EXAMPLE 5

Mixed (n-PrCp)$_2$ZrCl$_2$/(t-BuCp)$_2$ZrCl$_2$ Catalyst

A sample (12.6 g) of the supported (n-PrCp)$_2$ZrCl$_2$ catalyst described in Example 1 above was mixed with 12.6 g sample of the supported (t-BuCp)$_2$ZrCl$_2$ catalyst described in Example 2 above. This mixture was shaken well enough in flask to ensure a homogeneous mix of the two supported catalysts.

The resulting mixed catalyst was used for ethylene/1-butene co-polymerization as described in Example 1 above.

EXAMPLE 6

Mixed (n-PrCp)$_2$ZrCl$_2$/(t-BuCp)$_2$ZrCl$_2$ Catalyst

A sample (30 g) of the support material described in Example 1 was suspended in 100 cm$^3$ heptane at 60° C. A combination of (n-PrCp)$_2$ZrCl$_2$ (0.381 g) and (t-BuCp)$_2$ZrCl$_2$ (0.409 g) dissolved in 40 cm$^3$ toluene was slowly added to the slurry of the support. After complete addition of the metallocene solution, stirring was a continued for an additional 1 h before the drying the catalyst to free-flowing powder under reduced pressure. The final catalyst had 0.6 wt % transition metal loading with a ratio of the two metallocenes being 1:1.

The resulting catalyst was then used in ethylene/1-butene co-polymerization as described in Example 1 using a 300 ppm hydrogen concentration.

EXAMPLE 7

Mixed (n-PrCp)$_2$ZrCl$_2$/(t-BuCp)$_2$ZrCl$_2$ Catalyst

The catalyst described in Example 6 above was used for ethylene/1-butene co-polymerization as described in Example 1, but, using 50 ppm hydrogen concentration in the reactor.

EXAMPLE 8

(n-prCp)$_2$ZrCl$_2$/(i-PrCp)$_2$ZrCl$_2$ Catalyst

A 20 gram sample of a 200° C. silica gel was suspended in 120 cm$^3$ toluene in a 500-cm$^3$ reaction flask equipped with a stirrer and a dropping funnel. The flask was cooled to 0° C. and 47 cm$^3$ of a 30 wt % methyl-alumoxane (MAO) solution in toluene was added slowly. After 15 minutes, the temperature was raised to 70° C. and the reaction continued for 3 h. Then 0.167 g (n-PrCp)$_2$ZrCl$_2$ combined in a vial with 0.667 g (i-PrCp)$_2$ZrCl$_2$ was dissolved in 25 cm$^3$ toluene and the resulting homogeneous mixture of the metallocenes was added slowly to the suspension of the support at 70° C. Reaction continued for 1 hour and then solvent was removed under reduced pressure to give a free-flowing powder. This catalyst with 0.6 wt % Zr loading, 80% of which is due to the (i-PrCp)$_2$ZrCl$_2$ metallocene, was tested in a manner similar the one described in Example 4 for ethylene/1-butene polymerization; the results are shown in Table 2.

EXAMPLE 9

(n-PrCp)$_2$ZrCl$_2$/(i-PrCp)$_2$ZrCl$_2$ Catalyst

A 30 g sample of a 200° C. silica gel was suspended in 200 cm$^3$ toluene in a 500-cm$^3$ reaction flask equipped with a stirrer and a dropping funnel. The flask was cooled to 0° C. and 106 cm$^3$ of a 30 wt % MAO solution in toluene was added slowly. After 15 minutes, the temperature was raised to 70° C. and the reaction continued for 4 h. Then 0.377 g (n-PrCp)$_2$ZrCl$_2$ combined in a vial with 1,508 g (i-PrCp)$_2$ZrCl$_2$ was dissolved in 30 cm$^3$ toluene and the resulting homogeneous mixture of the metallocenes was added slowly to the suspension of the support at 70° C. Reaction continued for 1.5 h and then solvent was removed under reduced pressure to give a free-flowing powder. This catalyst with 0.75 wt % Zr loading, 80% of which is due to the (i-PrCp)$_2$ZrCl$_2$ metallocene, was tested in a manner similar the one described in Example 4 for ethylene/1-butene polymerization; the results are shown in Table 2.

EXAMPLE 10

(n-PrCp)$_2$ZrCl$_2$/(i-PrCp)$_2$ZrCl$_2$ Catalyst

At 24° C., 1 kg of 200° C. dehydrated silica was charged into an 8-liter reactor and 3.5 liters of a 30 wt % methyl-alumoxane in toluene was added followed by the addition of 3 liters of dried toluene. The temperature was then raised to 68° C. and the mixture was stirred for 4 hours. Then 49.5 g of (i-PrCp)$_2$ZrCl$_2$ mixed with 12.4 g (n-PrCp)$_2$ZrCl$_2$ and dissolved together in 300 cc of dry toluene was slowly added. Stirring continued for 2 more hours after all the metallocene solution had been added. The solvent was then removed at the reaction temperature to afford a free-flowing powder. A sample of the catalyst was tested for ethylene/1-butene polymerization as described in Example 4; the results are shown in Table 2.

EXAMPLE 11

(n-PrCp)$_2$ZrCl$_2$/(i-PrCp)$_2$ZrCl$_2$ Catalyst

A 20 g sample of a 200° C. silica gel was suspended in 120 cm$^3$ toluene in a 500-cm$^3$ reaction flask equipped with a stirrer and a dropping funnel. The flask was cooled to 0° C. and 60 cm$^3$ of a 30 wt % MAO solution in toluene was added slowly. After 15 minutes, the temperature was raised to 70° C. and the reaction continued for 4 h. Then 0,377 g (n-PrCp)$_2$ZrCl$_2$ combined in a vial with 1.508 g (i-PrCp)$_2$ZrCl$_2$ was dissolved in 25 cm$^3$ toluene and the resulting homogeneous mixture of the metallocenes was added slowly to the suspension of the support at 70° C. Reaction continued for 1.5 h and then solvent was removed under reduced pressure to give a free-flowing powder. This catalyst with 0.75 wt % Zr loading, 70% of which is due to the (i-

TABLE 1

| Example | Catalyst Rate (g/h) | Product Rate (g/h) | Efficiency[1] g/g | Density g/cc | $M_w$ g/mol | MWD | Zr wt % (t-BuCp)$_2$ZrCl$_2$ | Zr wt % (nPrCp)$_2$ZrCl$_2$ |
|---|---|---|---|---|---|---|---|---|
| 1 | 0.364 | 355 | 975 | 0.909 | 102800 | 2.8 | — | 0.6 |
| 2 | 0.164 | 166 | 1013 | 0.910 | 89000 | 4.6 | 0.6 | — |
| 3 | 0.043 | 170 | 3910 | 0.904 | 98300 | 2.4 | 0.34* | 0.26* |
| 4 | 0.200 | 152 | 760 | 0.944 | 103800 | 2.6 | 0.34* | 0.26* |
| 5 | 0.097 | 254 | 2622 | 0.904 | 109000 | 3.0 | 0.3 | 0.3 |
| 6 | 0.189 | 177 | 936 | 0.906 | 80300 | 4.3 | 0.3 | 0.3 |
| 7 | 0.151 | 169 | 1118 | 0.905 | 130500 | 4.1 | 0.3 | 0.3 |

[1]Efficiency at 150 psi;
*The Zr loading takes into account the weight contribution of the t-Bu group relative to the n-Pr group.

PrCp)$_2$ZrCl$_2$ metallocene, was tested in a manner similar the one described in Example 4 for ethylene/1-butene polymerization; the results are shown in Table 2.

EXAMPLE 12

(n-PrCp)$_2$ZrCl$_2$/(i-PrCp)$_2$ZrCl$_2$ Catalyst

At 24° C., 800 g of 200° C. dehydrated silica was charged into an 8-liter reactor and 1570 cm$^3$ of a 30 wt % MAO in toluene was added followed by the addition of 2 liters of dried toluene. The temperature was then raised to 68° C. and the mixture was stirred for 4 hours. Then 22.1 g of (i-PrCp)$_2$ZrCl$_2$ mixed with 8.8 g (n-PrCp)$_2$ZrCl$_2$ and dissolved together in 200 cc of dry toluene was slowly added. Stirring continued for 1 more hours after all the metallocene solution had been added. The solvent was then removed at the reaction temperature to afford a free-flowing powder. A sample of the catalyst was tested for ethylene/1-butene polymerization as described in Example 4 at different concentrations of aluminum alkyl on the seed bed; the results are shown in Table 2.

EXAMPLE 13 & 14

(n-PrCp)$_2$ZrCl$_2$/(i-PrCp)$_2$ZrCl$_2$ Catalyst

The catalyst described in Example 12 above was used for ethylene/1-butene co-polymerization as described in Example 4, but, at different levels of aluminum alkyl on the seed bed. The results are summarized in Table 2.

EXAMPLE 15

(n-PrCp)$_2$ZrCl$_2$/(i-PrCp)$_2$ZrCl$_2$ Catalyst

The catalyst described in Example 12 above was used for ethylene/1-butene co-polymerization as described in Example 1 with 700 ppm hydrogen in the reactor. The results are summarized in Table 2.

EXAMPLE 16

(n-PrCp)$_2$ZrCl$_2$/(i-PrCp)$_2$ZrCl$_2$ Catalyst

A 16.5 g sample of a 200° C. silica gel was suspended in 150 cm$^3$ toluene in a 500-cm$^3$ reaction flask equipped with a stirrer and a dropping funnel. The flask was cooled to 0° C. and 47 cm$^3$ of a 30 wt % MAO solution in toluene was added slowly. After 30 minutes, the temperature was raised to 70° C. and the reaction continued for 3 hours. Then 0,176 g (n-PrCp)$_2$ZrCl$_2$ combined in a vial with 0.440 g (i-PrCp)$_2$ZrCl$_2$ was dissolved in 25 cm$^3$ toluene and the resulting homogeneous mixture of the metallocenes was added slowly to the suspension of the support at 70° C. Reaction continued for 1 h and then solvent was removed under reduced pressure to give a free-flowing powder. This catalyst with 0.5 wt % Zr loading, 70% of which is due to the (i-PrCp)$_2$ZrCl$_2$ metallocene, was tested in a manner similar the one described in Example 4 for ethylene/1-butene polymerization; the results are shown in Table 2.

EXAMPLE 17

(n-PrCp)$_2$ZrCl$_2$/(i-PrCp)$_2$ZrCl$_2$ Catalyst

A 20 g sample of a 200° C. silica gel was suspended in 130 cm$^3$ toluene in a 500-cm$^3$ reaction flask equipped with a stirrer and a dropping funnel. The flask was cooled to 0° C. and 47 cm$^3$ of a 30 wt % MAO solution in toluene was added slowly. After 30 minutes, the temperature was raised to 70° C. and the reaction continued for 3 hours. Then 0,493 g (i-PrCp)$_2$ZrCl$_2$ dissolved in 23 cm$^3$ toluene was added slowly to the suspension of the support at 70° C. Reaction continued for 1 h and then 0.198 g (n-PrCp)$_2$ZrCl$_2$ dissolved in 23 cm$^3$ toluene was added slowly. After 1 h, the solvent was removed under reduced pressure to give a free-flowing powder. This catalyst with 0.5 wt % Zr loading, 70% of which is due to the (i-PrCp)$_2$ZrCl$_2$ metallocene, was tested in a manner similar the one described in Example 4 for ethylene/1-butene polymerization; the results are shown in Table 2.

EXAMPLE 18

(n-PrCp)$_2$ZrCl$_2$/(i-PrCp)$_2$ZrCl$_2$ Catalyst

A 20 g sample of a 200° C. silica gel was suspended in 130 cm$^3$ toluene in a 500-cm$^3$ reaction flask equipped with a stirrer and a dropping funnel. The flask was cooled to 0° C. and 47 cm$^3$ of a 30 wt % MAO solution in toluene was added slowly. After 30 minutes, the temperature was raised to 70° C. and the reaction continued for 3 h. Then 0.197 g (n-PrCp)$_2$ZrCl$_2$ dissolved in 23 cm$^3$ toluene was added slowly to the suspension of the support at 70° C. Reaction continued for 1 h and then 0.493 g (i-PrCp)$_2$ZrCl$_2$ dissolved in 23 cm$^3$ toluene was added slowly. After 1 h, the solvent was removed under reduced pressure to give a free-flowing powder. This catalyst with 0.5 wt % Zr loading, 70% of which is due to the (i-PrCp)$_2$ZrCl$_2$ metallocene, was tested in a manner similar the one described in Example 4 for ethylene/1-butene polymerization; the results are shown in Table 2.

EXAMPLE 19

(n-PrCp)$_2$ZrCl$_2$ Catalyst

At 24° C., 680 g sample of 200° C. dehydrated silica was charged into an 8-liter reactor and 1200 cm$^3$ of a 30 wt % MAO in toluene was added followed by the addition of 2 liters of dried toluene. The temperature was then raised to 68° C. and the mixture was stirred for 4 hours. Then 16.5 g (n-PrCp)$_2$ZrCl$_2$ and dissolved in 200 cc of dry toluene was slowly added. Stirring continued for 2 more hours after all the metallocene solution had been added. The solvent was then removed at the reaction temperature to afford a free-flowing powder. A sample of the catalyst was tested for ethylene/1-butene polymerization as described in Example 4. The results are shown in Table 2.

EXAMPLE 20

(i-PrCp)$_2$ZrCl$_2$ Catalyst

A 20 g sample of a 200° C. silica gel was suspended in 120 cm$^3$ toluene in a 500-cm$^3$ reaction flask equipped with a stirrer and a dropping funnel. The flask was cooled to 0° C. and 90 cm$^3$ of a 30 wt % MAO solution in toluene was added slowly. After 45 minutes, the temperature was raised to 70° C. and the reaction continued for 4 h. Then 1.32 g (i-PrCp)$_2$ZrCl$_2$ was dissolved in 30 cm$^3$ toluene and added slowly to the suspension of the support at 70° C. Reaction continued for 1 h and then the solvent was removed under reduced pressure to give a free-flowing powder. This catalyst was tested in a manner similar the one described in Example 4 for ethylene/1-butene polymerization; the results are shown in Table 2.

TABLE 2

| Example | Alkyl on Bed[1] (ppm) | Catalyst Rate (g/h) | Product Rate[2] (g/h) | Efficiency[2] (g/g) | $M_w$ (g/mol) | MWD | Zr wt % | |
|---|---|---|---|---|---|---|---|---|
| | | | | | | | (iPrCp)$_2$ZrCl$_2$ | (nPrCp)$_2$ZrCl$_2$ |
| 8 | 213 | 0.20 | 226 | 1131 | 80500 | 5.7 | 0.48 | 0.12 |
| 9 | 127 | 0.15 | 251 | 1670 | 84700 | 4.2 | 0.60 | 0.15 |
| 10 | 129 | 0.15 | 237 | 1582 | 86200 | 4.5 | 0.60 | 0.15 |
| 11 | 185 | 0.23 | 488 | 2123 | 74200 | 3.6 | 0.54 | 0.22 |
| 12 | 0 | 0.30 | 322 | 1076 | 77400 | 4.2 | 0.43 | 0.17 |
| 13 | 82 | 0.20 | 257 | 1283 | 87000 | 3.9 | 0.43 | 0.17 |
| 14 | 193 | 0.21 | 245 | 1169 | 82000 | 3.8 | 0.43 | 0.17 |
| 15 | 200 | 0.13 | 252 | 1924 | 33900 | 4.2 | 0.43 | 0.17 |
| 16 | 131 | 0.29 | 358 | 1234 | 66000 | 5.9 | 0.36 | 0.14 |
| 17 | 131 | 0.20 | 334 | 1672 | 72100 | 3.7 | 0.36 | 0.14 |
| 18 | 129 | 0.22 | 355 | 1614 | 76100 | 4.6 | 0.36 | 0.14 |
| 19 | 86 | 0.18 | 246 | 2887 | 67400 | 2.8 | — | 0.40 |
| 20 | 228 | 0.21 | 90 | 429 | 109500 | 10.5 | 0.70 | — |

[1]Aluminum alkyl concentration on polymer bed in the reactor (alkyl used as impurity scavenger)
[2]At 150 psi.

While the present invention has been described and illustrated by reference to particular embodiments thereof, it will be appreciated by those of ordinary skill in the art that invention lends itself to variations not necessarily illustrated herein. For instance, the catalyst system may comprise various other transition metal components including single or multiple cyclopentadienyl components reacted with either a metal alkyl component or alkoxy component or as previously described an ionic compound component. For this reason, then, reference should be made solely to the appended claims for purposes of determining the true scope of the present invention.

What is claimed is:

1. A process for producing ethylene polymers having a broad molecular weight distribution and a unimodal molecular weight distribution, said process comprising the steps of:
   (a) polymerizing ethylene monomer, optionally with comonomer, in the presence of a catalyst system comprising:
      (i) a first component comprising at least one first transition metal metallocene of Group IV or V of the Periodic Table of Elements having at least one cyclopentadienyl ring that is substituted with a first substituent, which is a C$_3$ to C$_{20}$ hydrocarbon substituent having a 2° or 3° carbon atom with which it is bonded to said at least one cyclopentadienyl ring of said first component in the system, and a second component comprising at least one second transition metal metallocene of Group IV or V of the Periodic Table of Elements having at least one cyclopentadienyl ring that is substituted with a second substituent, which is hydrogen or optionally a C$_3$ to C$_{20}$ hydrocarbon substituent different from said first substituent, with which it is bonded to said at least one cyclopentadienyl ring of said second component in the system; and
      (ii) an activator selected from ionic activators or alumoxane or combinations thereof.

2. The process in accordance with claim 1 wherein said first and second components comprise first and second transition metal metallocenes, respectively, selected from the group of metallocenes represented by the general formulas:

I. , and

II. 

wherein (C$_5$R'$_k$) is a substituted cyclopentadienyl; M is selected from the group consisting of Group IVB and Group VB transition metals; with at least one substituent R' in the system being a hydrocarbon or substituted hydrocarbon group comprising a 2° or 3° carbon atom through which it is covalently bonded to said at least one cyclopentadienyl group, with a second substituent R' in the system being different from the first substituent R', with the second substituent R' and the remainder R' groups being hydrogen or a hydrocarbyl radical selected from the group consisting of alkyl, alkenyl, aryl, alkylaryl, and arylalkyl radicals having 1 to 20 carbon atoms, or a silicon-containing radical, or a hydrocarbyl radical wherein two carbon atoms are joined together to form a C$_4$-C$_6$ ring; R" is C$_1$-C$_4$ alkylene radical, a germanium or silicon containing radical, or a phosphine or amine radical bridging one pair of the (C$_5$R'$_k$) rings; each Q is independently a halogen or a hydrocarbyl radical selected from the group consisting of aryl, alkyl, alkenyl, alkylaryl and arylalkyl having 1–20 carbon atoms, or a hydrocarboxyl radical having 1–20 carbon atoms; Q' is an alkylidene radical having from 1 to about 20 carbon atoms; s is 0 or 1, g is 0, 1 or 2; when g is 0, s is 0; k is 4 when s is 1 and k is 5 when s is 0.

3. The process in accordance with claim 1 wherein said polymerizing occurs in a solution, gas, or slurry phase reactor.

4. The process in accordance with claim 1 wherein said first hydrocarbon substituent is an alkyl having in the range of 3 to about 10 carbon atoms.

5. The process in accordance with claim 4 wherein said first hydrocarbon substituent is an alkyl having in the range of 3 to about 5 carbon atoms.

6. The process in accordance with claim 1 wherein said first hydrocarbon substituent is selected from the group consisting of t-butyl, i-Propyl, and a 2° pentyl substituent.

7. The process in accordance with claim 1 wherein said alpha-olefins are selected from the group consisting of ethene, propene, butene, pentene, hexene, heptene, octene, 4-methyl-1-pentene, and combinations thereof.

8. The process in accordance with claim 1 wherein said transition metal metallocene is selected from the group consisting of titanium, zirconium, hafnium, and combinations thereof.

9. The process in accordance with claim 1 wherein said catalyst system comprises a support.

10. The process in accordance with claim 1 wherein said alumoxane is methylalumoxane.

11. The process in accordance with claim 1 wherein said first component is mixed with said second component by a physical mix.

12. The process in accordance with claim 11 wherein said first component is formed on a first support independently from the formation of said second component on a second support.

13. The process in accordance with claim 1 wherein said first component is mixed with said second component by a chemical mix.

14. The process in accordance with claim 13 wherein said first and second components are formed on the same support.

15. The process in accordance with claim 1 wherein the ratio of said first to said second components in said system is varied to achieve control over the molecular weight distribution of the polymer produced.

16. A process for polymerizing ethylene monomer, optionally with alpha-olefin comonomers in the presence of a catalyst system, said process comprising:
 a) contacting said catalyst system with said ethylene monomer, optionally with alpha-olefin comonomers, said catalyst system comprising a first component comprising at least one transition metal compound of Group IV or V having at least one substituted cyclopentadienyl ring, the substituent of which is a $C_3$ to $C_{20}$ hydrocarbon having a 2° or 3° carbon atom which it is bonded to said cyclopentadienyl ring; and a second component comprising at least one second transition metal compound of Group IV or V of the Periodic Table of Elements having at least one cyclopentadienyl ring that is substituted with hydrogen or substituted with a $C_3$ to $C_{20}$ hydrocarbon substituent different from said first component, and an activator or cocatalyst for said transition metal compounds, and
 b) recovering ethylene polymer product having a molecular weight distribution greater than 3 and a unimodal molecular weight distribution.

17. The process in accordance with claim 16 wherein the ethylene polymer has a molecular weight distribution in the range of about 4 to about 20.

* * * * *